United States Patent
Otanez et al.

(10) Patent No.: US 8,652,002 B2
(45) Date of Patent: Feb. 18, 2014

(54) METHOD OF OPERATING A TORQUE CONVERTER CLUTCH

(75) Inventors: Paul G. Otanez, Troy, MI (US); Zhen J. Zhang, Canton, MI (US); Robert L. Moses, Ann Arbor, MI (US); Gary E. McGee, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 8 days.

(21) Appl. No.: 13/442,404

(22) Filed: Apr. 9, 2012

(65) Prior Publication Data

US 2013/0264164 A1    Oct. 10, 2013

(51) Int. Cl.
*F16H 61/48* (2006.01)

(52) U.S. Cl.
USPC .................. 477/54; 477/83; 477/176

(58) Field of Classification Search
USPC ................ 477/52–54, 70, 83, 166, 174, 176; 701/67
See application file for complete search history.

(56) References Cited

U.S. PATENT DOCUMENTS

| | | | |
|---|---|---|---|
| 8,112,208 B2* | 2/2012 | McGee et al. | 701/54 |
| 8,280,599 B2* | 10/2012 | Suzuki et al. | 701/54 |
| 2003/0153428 A1* | 8/2003 | Kitano et al. | 477/5 |
| 2009/0105918 A1* | 4/2009 | Kobayashi et al. | 701/67 |
| 2009/0294194 A1* | 12/2009 | Kitano et al. | 180/65.265 |
| 2011/0136620 A1* | 6/2011 | Gibson et al. | 477/64 |
| 2012/0010044 A1* | 1/2012 | Gibson et al. | 477/52 |

\* cited by examiner

*Primary Examiner* — Justin Holmes

(57) ABSTRACT

A method of operating a torque converter clutch in an engine start-stop vehicle improves launch after an auto stop event. During the autostop event, hydraulic fluid is supplied to the torque converter clutch operator through one or more solenoid valves by an auxiliary electric pump. When the prime mover is started at the conclusion of the autostop event, the torque converter clutch is thus locked, assuring rapid and sufficient torque transfer through the torque converter to the transmission and improved acceleration during vehicle launch. As the vehicle accelerates, the hydraulic pressure in the clutch operator is reduced and slip through the clutch increased to achieve a smooth launch and return to conventional torque converter operation.

16 Claims, 2 Drawing Sheets

METHOD OF OPERATING A TORQUE CONVERTER CLUTCH

FIELD

The present disclosure relates to automatic transmission torque converter lockup clutches utilized in engine start-stop (ESS) applications and more particularly to a method of operating a torque converter lockup clutch in an engine start-stop application that improves launch performance and acceleration.

BACKGROUND

The statements in this section merely provide background information related to the present disclosure and may or may not constitute prior art.

The generally acknowledged most significant operational difference between a conventional vehicle powertrain and one configured for engine start-stop operation is the delay the driver experiences before feeling acceleration during an autostart event. Whereas the engine of a conventional vehicle remains running at idle when the vehicle is, for example, stopped in traffic, so that when the brake is released and the accelerator pedal is depressed, engine speed quickly increases above idle and the degree of torque converter coupling and torque delivery through the transmission rapidly increases, in an engine start-stop powertrain, after the brake is released and the accelerator is depressed, the engine must first crank and re-start and then, as engine speed increases, begin to transmit torque through the torque converter and the transmission.

Although it would appear that the sequence of engine start and speed ramp up are primarily responsible for the vehicle motion and acceleration delay, it has been found that some delay is caused by the fact that torque throughput cannot be quickly established through the fluid coupling of the torque converter, especially when the input to the torque converter and thus the torque converter pump were previously stationary due to the stopped engine.

SUMMARY

The present invention provides a method of operating a torque converter lockup clutch (TCC) which minimizes start up delay in an engine start-stop powertrain while still maximizing the driveline isolation that the transmission provides. Since both the prime mover and the transmission hydraulic pump are stationary during an autostop event, an accumulator or an auxiliary electric pump is included to temporarily provide pressurized hydraulic fluid. This pressurized hydraulic fluid may also be utilized to maintain positions of or restroke clutches in the automatic transmission. When an engine autostop event occurs, the prime mover stops and the vehicle remains in gear when an auxiliary pump is utilized but drops out of gear when an accumulator is utilized. During or at the conclusion of the autostop event (depending upon whether a pump or an accumulator is utilized), hydraulic fluid is supplied to the hydraulic operator of the torque converter clutch through one or more solenoid valves to engage this clutch.

Thus, when the prime mover is started at the conclusion of the autostop event, the torque converter clutch is engaged or locked, thereby assuring prompt and sufficient torque transfer through the torque converter to the transmission and rapid and suitable acceleration during vehicle launch. Moreover, since the torque converter clutch is locked, any torque input to the transmission from the starter motor or the engine is transferred to the wheels. As the vehicle accelerates, the hydraulic pressure in the clutch operator is reduced and slip through the clutch increases to achieve a smooth launch and allow the torque converter to function as a conventional torque converter. The hydraulic pressure may be reduced and the slip increased according to one of several approaches. For example, the pressure may be reduced according to a simple step function, reduced according to a linear or higher order function or reduced according to a specific, typically predetermined, torque converter speed versus clutch slip function. These functions may, of course, be programs or subroutines of and stored within an electronic control module such as a transmission control module (TCM), an engine control module (ECM) or other dedicated or vehicle control system or module.

Thus it is an aspect of the present invention to provide a method of operating a torque converter lockup clutch in an engine start-stop (ESS) motor vehicle powertrain.

It is a further aspect of the present invention to provide a method of operating a torque converter clutch in an engine start-stop motor vehicle powertrain which engages the torque converter clutch during an autostop event.

It is a still further aspect of the present invention to provide a method of operating a torque converter clutch in an engine start-stop motor vehicle powertrain which utilizes hydraulic fluid from an auxiliary pump or accumulator.

It is a still further aspect of the present invention to provide a method of operating a torque converter clutch in an engine start-stop motor vehicle powertrain which disengages the torque converter clutch during vehicle launch.

It is a still further aspect of the present invention to provide a method of operating a torque converter clutch in an engine start-stop motor vehicle powertrain which provides increased slip during vehicle launch.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
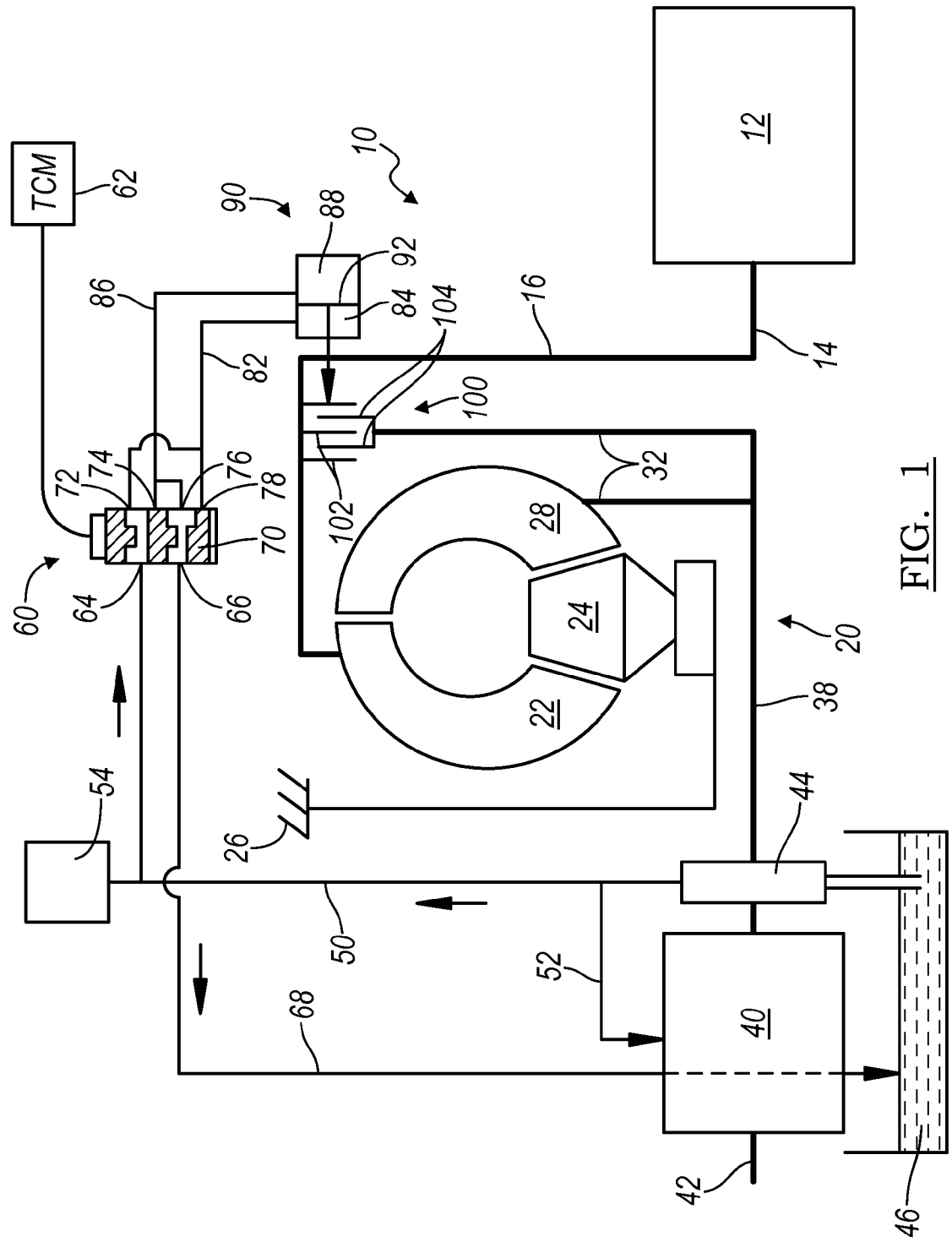
FIG. 1 is a diagrammatic illustration of a portion of a motor vehicle powertrain including a prime mover, a lockup torque converter and a transmission.

With reference to FIG. 1, a portion of a motor vehicle powertrain is illustrated and generally designated by the reference number 10. The motor vehicle powertrain 10 includes a prime mover 12 which may be either a gasoline, flexible fuel or Diesel engine, an electric motor or motors or a hybrid power plant having a combination of one or more engines and one or more electric motors. Drive torque from the prime mover 12 is provided in a crankshaft 14 to an input shaft 16 of a lockup torque converter assembly 20. The lockup torque converter assembly 20 includes a pump 22 which is coupled to and driven by the input shaft 16, a stator 24 which is grounded to a stationary housing 26 of the torque converter assembly 20 and a turbine 28. The turbine 28 is coupled to and drives an output member 32 which is coupled to by, for example, splines or an integral component of a transmission input shaft 38 of an automatic transmission 40. The automatic transmission 40 typically will include a plurality of planetary gear assemblies generally arranged in tandem as well as friction brakes and clutches (all not illustrated) or it may be a dual clutch transmission (DCT) having a pair of inputs clutches and a pair of countershafts, a continuously variable transmission (CVT) or another type of automatic or manual transmission. The automatic transmission 40 provides drive torque to a final drive assembly (FDA) of a motor vehicle (both not illustrated) through a transmission output shaft 42.

Secured about and driven by the transmission input shaft 38 is a hydraulic pump 44 which draws hydraulic fluid (transmission oil) from a transmission sump 46 and supplies pressurized hydraulic fluid to a hydraulic supply line 50 when the transmission input shaft 38 is rotating. The hydraulic pump 44 may be a vane, gear or gerotor type pump, for example. The hydraulic supply line 50 provides pressurized hydraulic fluid to, for example, the valve body (not illustrated) of the automatic transmission 40 through a transmission supply line 52 and to an auxiliary pressure device 54. The auxiliary pressure device 54 may be a spring or gas driven accumulator which provides a reserve of pressurized hydraulic fluid when the input shaft 38 of the transmission 40 and thus the hydraulic pump 44 are not rotating which, among other situations, occurs during an autostop event. Alternatively, a small, electrically operated hydraulic pump may be utilized to supply pressurized hydraulic fluid when the (main) hydraulic pump 44 is not operating. The hydraulic supply line 50 also communicates with a solenoid valve 60 which may be a variable force solenoid (VFS) valve or similar or other type of valve and which may be controlled by a transmission control module (TCM) 62 or similar or other type of controller or microprocessor such as an engine control module (ECM).

The solenoid valve 60 includes an inlet or supply port 64 which is in fluid communication with the supply line 50 and an outlet or exhaust port 66 which returns hydraulic fluid to the transmission sump 46 in a return line 68. A valve spool 70 defining various lands and passageways translates axially to open and close certain flow pathways as described below. The solenoid valve 60 also includes a first, release supply port 72, a second, apply supply port 74, a third, apply exhaust port 76 and a fourth, release exhaust port 78. The first, release port 72 and the fourth release port 78 feed through a release line 82 to a release side or chamber 84 of a hydraulic clutch operator 90 and the second apply port 74 and the third apply port 76 feed through an apply line 86 to an apply side or chamber 88 of the hydraulic clutch operator 90. The hydraulic clutch operator 90 includes a piston 92 which define the release chamber 84 on one side and the apply chamber 88 on the other.

In a first position of the valve spool 70, generally illustrated in FIG. 1, hydraulic fluid flow from the inlet port 64 is provided to the first, release supply port 72, though the release line 82 and to the release chamber 84 of the hydraulic clutch operator 90 and hydraulic fluid from the apply chamber 88 flows through the apply line 86 to the third, apply exhaust port 76, out the exhaust port 66 and through the return line 68 to the transmission sump 46. Thus, the piston 92 of the hydraulic clutch operator 90 moves to the right in FIG. 1. In a second position of the valve spool 70, hydraulic fluid flow from the inlet port 64 is provided to the second, apply supply port 74, through the apply line 86 to the apply chamber 88 of the hydraulic clutch operator 90 and hydraulic fluid from the release chamber 84 flows through the release line 82, to the fourth, release exhaust port 78, out the exhaust port 66 and through the return line 68 to the transmission sump 46. Now the piston 92 of the hydraulic clutch operator 90 moves to the left in FIG. 1.

In this manner, the position of the piston 92 of the hydraulic clutch operator 90 may be controlled and modulated. It should be understood that this arrangement is exemplary only and that other valve configurations and fluid supply and exhaust arrangements may be utilized to achieve this function. Such other arrangements are deemed to be fully within the purview of this invention.

The hydraulic clutch operator 90 is a component of a lockup clutch 100 of the torque converter assembly 20. As such, the lockup clutch 100 includes a first set or plurality of friction clutch plates or discs 102 which are coupled to the input shaft 16 of the torque converter assembly 20 by, for example, interengaging splines (not illustrated). Interleaved with the first set or plurality of friction clutch plates or discs 102 are a second set or plurality of clutch plates or discs 104 that are coupled to the output member 32 of the torque converter assembly 20 by, for example, interengaging splines (not illustrated).

When pressurized hydraulic fluid is provided to the apply chamber 88 of the hydraulic clutch operator 90 by the solenoid valve 60, the first and second sets of the clutch plates or discs 102 and 104 are compressed in accordance with the summed hydraulic pressure applied to the piston 92 and torque is transmitted from the input shaft 16 to the output member 32 (and the transmission input shaft 38).

In operation, when an accumulator is utilized as the auxiliary pressure device 54 and an autostop (engine stop) event occurs, the prime mover 12, the transmission input shaft 38 and the hydraulic pump 44 cease to rotate. Thus, no pressurized hydraulic fluid is provided by the (main) hydraulic pump 44 and pressure in the supply line 50 (and the remainder of the automatic transmission 40) drops and the automatic transmission 40 enters a neutral state. During the autostop event, the solenoid valve 60 (and other valves in the transmission 40) are energized. When the prime mover 12 cranks at the end of an autostop event, the accumulator auxiliary pressure device 54 is discharged, the valve spool 70 moves to the above-designated second position, hydraulic fluid is supplied to the apply chamber 88 of the hydraulic clutch operator 90 of the torque converter clutch assembly 20, and the lockup clutch 100 is engaged.

When an auxiliary electric pump is utilized as the auxiliary pressure device 54 and an autostop (engine stop) event occurs, the prime mover 12, the transmission input shaft 38 and the hydraulic pump 44 cease to rotate. While no pressurized hydraulic fluid is provided by the (main) hydraulic pump 44, pressure in the supply line 50 is maintained and pressurized hydraulic fluid is supplied by the electric pump auxiliary pressure device 54. Thus, the automatic transmission 40 remains in gear. During the autostop event, the solenoid valve 60 (and other valves in the transmission 40) are energized, the valve spool 70 moves to the above-designated second position and hydraulic fluid is supplied to the apply chamber 88 of the hydraulic clutch operator 90 of the torque converter clutch assembly 20 to engage the lockup clutch 100.

Thus, when the prime mover 12 is started at the conclusion of the autostop event, the torque converter lockup clutch 100 will be engaged or locked, thereby assuring prompt and sufficient torque transfer through the torque converter assembly 20 to the transmission 40 and rapid and suitable acceleration during vehicle launch. As the vehicle accelerates, the hydraulic pressure in the hydraulic clutch operator 90 may be reduced and slip through the lockup clutch 100 increased to achieve a smooth launch and allow the torque converter assembly 20 to function as a conventional torque converter, i.e., as a fluid coupling and a torque multiplier.

The hydraulic pressure applied to the apply chamber 88 of the hydraulic clutch operator 90 of the lockup clutch 100 may be reduced and the resulting slip increased according to one of several approaches. For example, the pressure may be reduced according to a simple step function. That is, the hydraulic pressure applied to the apply chamber 88 of the clutch operator 90 may be reduced in, for example, ten equal ten percent increments over a few seconds, a smaller number of larger increments, a larger number of smaller increments, unequal increments, e.g., smaller initial increments and larger subsequent increments and increments over longer or shorter periods of time as well as combinations thereof.

Furthermore, the hydraulic pressure applied to the apply chamber 88 of the clutch operator 90 may be reduced (and the resulting slip of the clutch 100 may be increased) according to a linear or higher order function. That is, rather than the pressure reducing and the slip increasing in steps or increments, the pressure and slip may be varied in accordance with a linear (proportional) relationship or according to a higher order function.

Finally, the hydraulic pressure applied to the apply chamber 88 of the clutch operator 90 may be reduced (and the resulting slip increased) according to a specific, typically predetermined, torque converter input speed versus clutch slip function. That is, data from a vehicle speed (or shaft speed) sensor may be utilized to achieve any degree of clutch engagement (or disengagement) and resulting clutch slip in accordance with a predetermined program or relationship. This speed versus slip relationship may be further refined or modified by delaying slip increase if the vehicle operator is calling for significant acceleration.

Figure 2:
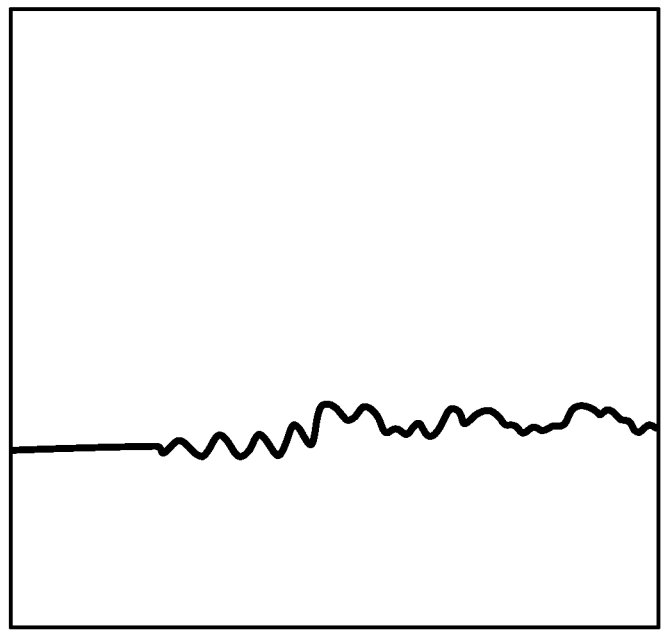
FIG. 2 is a graph illustrating the performance of a prior art engine start-stop powertrain during an engine stopped, engine start and accelerate event.
Figure 3:
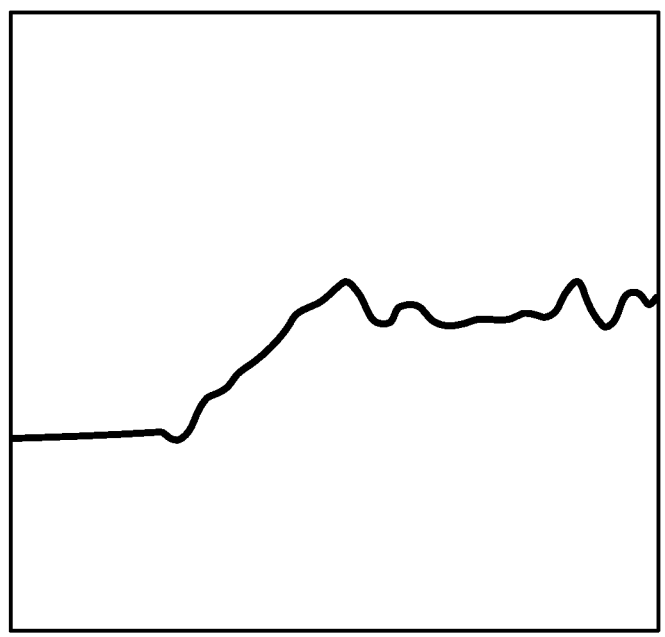
FIG. 3 is a graph illustrating the performance of an engine start-stop powertrain utilizing the method of the present during an engine stopped, engine start and accelerate event.

FIGS. 2 and 3 illustrate the comparative launch performance (acceleration) of an engine start-stop configured vehicle during autostart. In both drawing figures time is represented on the horizontal (X) axis. FIG. 2, which represents a conventional, prior art, engine start-stop configured vehicle, illustrates that to achieve a certain acceleration, S1 seconds elapse. FIG. 3 represents a similar event of an engine start-stop configured vehicle incorporating and operating according to the method of the present invention. Here, only S2 seconds elapse before the vehicle achieves the same acceleration. Thus, an exemplary engine start-stop configured vehicle operating according to the present inventive method requires only approximately one fourth the time to reach the same acceleration relative to a conventional, prior art engine start-stop configured vehicle at the commencement of an autostart event.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of operating a torque converter clutch in a powertrain configured for engine start-stop operation, comprising the steps of
providing a torque converter having a clutch and an actuator,
providing a prime mover and stopping said prime mover,
providing an accumulator for providing a flow of pressurized hydraulic fluid while said prime mover is stopped,
providing at least a portion of said flow of pressurized hydraulic fluid to said actuator to lockup said clutch,
starting said prime mover, and
reducing hydraulic fluid pressure to said actuator to allow slip of said clutch.

2. The method of operating a torque converter clutch of claim 1 wherein said stopping of said prime mover occurs when an associated vehicle is stationary.

3. The method of operating a torque converter clutch of claim 1 wherein said prime mover provided is a gasoline, flex fuel, Diesel, electric or hybrid power plant.

4. The method of operating a torque converter clutch of claim 1 wherein said pressure reducing step occurs after an associated vehicle is moving.

5. The method of operating a torque converter clutch of claim 1 wherein said flow of pressurized hydraulic fluid is controlled by a solenoid valve controlled by a transmission control module.

6. The method of operating a torque converter clutch of claim 1 further including the step of providing an automatic transmission having an input driven by said torque converter.

7. A method of operating a torque converter lockup clutch in a powertrain to improve vehicle launches, comprising the steps of:
providing a prime mover and a torque converter having a lockup clutch and an actuator,
stopping said prime mover,
providing a flow of hydraulic fluid under pressure from an accumulator when said prime mover is stopped,
controlling said flow of pressurized hydraulic fluid to said actuator to engage said lockup clutch,
starting said prime mover, and
reducing hydraulic pressure to said actuator during vehicle launches to allow slip of said lockup clutch.

8. The method of operating a torque converter clutch of claim 7 wherein said stopping of said prime mover occurs when an associated vehicle is stationary.

9. The method of operating a torque converter clutch of claim 7 wherein said prime mover provided is a gasoline, flex fuel, Diesel, electric or hybrid power plant.

10. The method of operating a torque converter clutch of claim 7 wherein said pressure reducing step occurs after such vehicle is moving.

11. The method of operating a torque converter clutch of claim 7 wherein said flow of pressurized hydraulic fluid is controlled by a solenoid valve controlled by a control module.

12. A method of operating a lockup clutch in a powertrain configured for engine start-stop operation, comprising the steps of:
providing a prime mover, a lockup clutch and a clutch actuator having an apply chamber,
stopping said prime mover,
providing a flow of hydraulic fluid under pressure while said prime mover is stopped,
controlling said flow of pressurized hydraulic fluid to said apply chamber of said actuator to engage said lockup clutch,
starting said prime mover,
adjusting hydraulic pressure to said apply chamber of said actuator during vehicle launches to allow slip of said lockup clutch,
wherein said clutch actuator is provided with a release chamber and further including the step of increasing hydraulic pressure to said release chamber while reducing said pressure in said apply chamber.

13. The method of operating a lockup clutch of claim 12 wherein said lockup clutch is a component of a torque converter.

14. The method of operating a lockup clutch of claim 12 wherein said flow of hydraulic fluid under pressure is provided by an auxiliary pump.

15. The method of operating a lockup clutch of claim 12 wherein said pressure is adjusted to achieve a smooth launch.

16. The method of operating a lockup clutch of claim 12 wherein said pressure reducing step occurs after such vehicle is moving.

* * * * *